US012692349B2

(12) United States Patent
Park et al.

(10) Patent No.: US 12,692,349 B2
(45) Date of Patent: Jul. 28, 2026

(54) SUBSTRATE FOR HEAT-RESISTANT ELECTRONIC DEVICE

(71) Applicant: LG CHEM, LTD., Seoul (KR)

(72) Inventors: Youngsun Park, Tokyo (JP); Shinji Shiraki, Tokyo (JP)

(73) Assignee: LG CHEM, LTD., Seoul (KR)

( * ) Notice: Subject to any disclaimer, the term of this patent is extended or adjusted under 35 U.S.C. 154(b) by 1064 days.

(21) Appl. No.: 17/600,954

(22) PCT Filed: Mar. 30, 2020

(86) PCT No.: PCT/KR2020/004286

§ 371 (c)(1),
(2) Date: Oct. 1, 2021

(87) PCT Pub. No.: WO2020/204513

PCT Pub. Date: Oct. 8, 2020

(65) Prior Publication Data

US 2022/0195118 A1 Jun. 23, 2022

(30) Foreign Application Priority Data

Apr. 2, 2019 (JP) ................................. 2019-070515

(51) Int. Cl.
*C08G 73/10* (2006.01)
*C08K 7/26* (2006.01)

(52) U.S. Cl.
CPC ............ *C08G 73/1039* (2013.01); *C08K 7/26* (2013.01); *C08K 2201/003* (2013.01)

(58) Field of Classification Search
None
See application file for complete search history.

(56) References Cited

U.S. PATENT DOCUMENTS

2009/0095391 A1 4/2009 Kojima
2012/0295085 A1 11/2012 Iida et al.
2014/0186587 A1* 7/2014 Shin .................... H05K 1/0274 428/336
2015/0137109 A1 5/2015 Park et al.
2016/0304722 A1* 10/2016 Kobori .................. G02B 1/118
2017/0073237 A1 3/2017 Lim et al.
2017/0154698 A1* 6/2017 Kim .................... G02F 1/13439
2017/0226257 A1 8/2017 Yun et al.
2018/0355172 A1 12/2018 Uno
2020/0108587 A1 4/2020 Han et al.

FOREIGN PATENT DOCUMENTS

| | | | | |
|---|---|---|---|---|
| CN | 1990799 | A | 7/2007 | |
| CN | 101687632 | A | 3/2010 | |
| CN | 103937241 | A | 7/2014 | |
| CN | 106164178 | A | 11/2016 | |
| EP | 3351582 | A1 * | 7/2018 | .......... C08F 290/065 |
| JP | H11-106508 | A | 4/1999 | |
| JP | 2002-146021 | A | 5/2002 | |
| JP | 2002-348374 | A | 12/2002 | |
| JP | 2010-087097 | A | 4/2010 | |
| JP | 5194755 | B2 | 5/2013 | |
| JP | 2015-530700 | A | 10/2015 | |
| KR | 2012-0106993 | A | 9/2012 | |
| KR | 2015-0137994 | A | 12/2015 | |
| KR | 2017-0032560 | A | 3/2017 | |
| KR | 1728100 | B1 | 4/2017 | |
| KR | 2018-0068252 | A | 6/2018 | |
| KR | 2018-0093007 | A | 8/2018 | |
| KR | 2019-0025072 | A | 3/2019 | |
| WO | 2008-062605 | A1 | 5/2008 | |

OTHER PUBLICATIONS

Office Action issued for Japanese Patent Application No. 2019-070515 on Jan. 31, 2023, with English translation, 7 pages.
International Search Report and Written Opinion dated Jul. 1, 2020, issued in the corresponding International Application No. PCT/KR2020/004286.

* cited by examiner

*Primary Examiner* — Megan Mcculley
(74) *Attorney, Agent, or Firm* — ROTHWELL, FIGG, ERNST & MANBECK, P.C.

(57) ABSTRACT

The present disclosure proposes an improved heat resistant base for electronic equipment having transparency, heat resistance and mechanical strength and also having superior optical properties and quality, and thereby capable of replacing a transparent glass base. The present disclosure is accomplished by the heat resistant base for electronic equipment including a polyimide-based resin and a hollow particle, wherein a plurality of the hollow particles are dispersed and present in the polyimide-based resin, and the hollow particle has an average particle diameter of greater than or equal to 10 nm and less than or equal to 300 nm.

13 Claims, No Drawings

SUBSTRATE FOR HEAT-RESISTANT ELECTRONIC DEVICE

This application is a 35 U.S.C. 371 National Phase Entry Application from PCT/KR2020/004286, filed on Mar. 30, 2020 and designating the United States, which claims priority to and the benefits of Japanese Patent Application No. 2019-070515, filed with the Japanese Intellectual Property Office on Apr. 2, 2019, the entire contents of which are incorporated herein by reference.

TECHNICAL FIELD

The present disclosure relates to a heat resistant base for electronic equipment and a method for preparing the same.

BACKGROUND OF THE INVENTION

In various electronic equipment such as mobile tools, digital cameras and displays becoming highly functionalized, replacement from an existing glass substrate to a transparent polymer base has been examined recently as advances have been made in high performance, miniaturization, weight lightening and flexibility.

Meanwhile, in examining the replacement to a transparent polymer base, transparency, heat resistance and strength, which are characteristics of an existing glass substrate, need to be considered as well. Particularly, in flexible devices, heat treatment of approximately 300° C. to 400° C. is required in thin film transistor (TFT) mounting, and a transparent polymer base having such excellent high heat resistance is required.

In the art, transparent polyimide resins such as fluorinated polyimide resins, semi-alicyclic or full-alicyclic polyimide resins have been proposed.

It is clear that polyimide-based polymer films proposed in the prior art technologies have excellent transparency, heat resistance and mechanical strength, but, from general characteristics of organic polymer materials, experience thermal decomposition when exposed to a high temperature of 320° C. or higher, which sometimes impairs functions as a transparent base, and functions such as transparency are sometime impaired since discoloration (particularly, discoloration to yellow or dark brown, cloudiness) occurs.

DISCLOSURE

Accordingly, there still have been needs to develop an improved highly heat resistant base for electronic equipment having transparency, heat resistance and mechanical strength and also having superior optical properties and quality, and thereby capable of replacing a transparent glass base.

The present disclosure is based on the finding that, by forming with a specific polyimide-based resin and a hollow particle dispersed therein, an improved (high) heat resistant base for electronic equipment having transparency, heat resistance and mechanical strength and also having superior optical properties and quality, and thereby capable of replacing a transparent glass base may be proposed.

One aspect of the present disclosure is as follows.

[1] A heat resistant base for electronic equipment, the base comprising, a polyimide-based resin and a hollow particle, wherein a plurality of the hollow particles are dispersed and present in the polyimide-based resin, and the hollow particle has an average particle diameter of greater than or equal to 10 nm and less than or equal to 300 nm.

[2] The heat resistant base for electronic equipment described in [1], wherein the polyimide-based resin is modified polyimide including a terminal group represented by the following Chemical Formula 1.

〈Chemical Formula 1〉 (described below)

[In Chemical Formula 1,

D is a thermo-curable or photo-curable functional group,

R is a divalent or higher organic group, and n is an integer of 1 or greater.]

[3] The heat resistant base for electronic equipment described in [2], wherein the functional group of Chemical Formula 1 is a thermo-curable or photo-curable functional group derived from a reaction of a terminal group of an acid dianhydride of polyimide, and a compound of the following Chemical Formula 2.

〈Chemical Formula 2〉 (described below)

[4] The heat resistant base for electronic equipment described in [2] or [3], wherein the polyimide-based resin is modified polyimide by 2,2'-bis(trifluoromethyl)-4,4'-diaminobiphenyl (TFMB) and 4,4'-oxydiphthalic anhydride (ODPA).

[5] The heat resistant base for electronic equipment described in [1], wherein the polyimide-based resin is a polyimide-based resin by polyimide including a structure of the following Chemical Formula A and polyamic acid including a structure of the following Chemical Formula B.

〈Chemical Formula A〉 (described below)

〈Chemical Formula B〉 (described below)

[In Chemical Formulae A and B,

X is a tetravalent organic group derived from an acid dianhydride, and

Y is a divalent organic group derived from a diamine.]

[6] The heat resistant base for electronic equipment described in [5], wherein, in Chemical Formula A and Chemical Formula B, X is formed including a tetravalent organic group having a fluoro atom-containing substituent, Y is formed including a divalent organic group having a fluoro atom-containing substituent, or, both X and Y are formed including an organic group having a fluoro atom-containing substituent.

[7] The heat resistant base for electronic equipment described in [6], wherein the divalent organic group having a fluoro atom-containing substituent is a divalent organic group by 2,2'-bis(trifluoromethyl)benzidine or 2,2-bis[4(-aminophenoxy)phenyl]hexafluoropropane.

[8] The heat resistant base for electronic equipment described in [6], wherein, in Chemical Formulae A and B, X is formed by being provided with a structure that is a tetravalent organic group having a fluoro atom-containing substituent, or a structure that is a tetravalent organic group not having a fluoro atom-containing substituent.

[9] The heat resistant base for electronic equipment described in [8], wherein the tetravalent organic group not having a fluoro atom-containing substituent is a compound selected from among 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, 2,3,3',4'-oxydiphthalic anhydride and mixtures thereof.

[10] The heat resistant base for electronic equipment described in any one of [1] to [9], wherein the hollow particle is a hollow silica particle.

[11] The heat resistant base for electronic equipment described in [10], wherein the hollow silica particle has an average particle diameter of greater than or equal to 40 nm and less than or equal to 150 nm.

[12] The heat resistant base for electronic equipment described in any one of [1] to [11], wherein the hollow particle is a hollow silica particle, and the polyimide-based resin has a refractive index of greater than or equal to 1.40 and less than or equal to 1.55 at a wavelength of 632.8 nm after curing.

[13] The heat resistant base for electronic equipment described in any one of [1] to [12], which has light transmittance of 85% or greater, haze of 1.0% or less, initial color b* (b* by CIE 1976 L*a*b* color space) of 1.0 or less, a difference of 0.5 or less between the initial color b*, and color b* after being exposed to an ultraviolet lamp in a UVB wavelength region for 72 hours or longer, and/or a yellowness index value “YI value” of 5.0 or less.

[14] The heat resistant base for electronic equipment described in any one of [1] to [13], which is a base as a basic structure of electronic equipment.

[15] The heat resistant base for electronic equipment described in any one of [1] to [14], which is a base as a base supporting a basic structure in a display, a lens, a thin film transistor (TFT), a polarizing plate, an alignment film, a color filter, an optical compensation film, an anti-reflection film, an anti-glare film, a surface treatment film, an anti-static film, a separator, a capacitor, a vibration element or an actuator.

Advantageous Effects

The present disclosure makes it possible to propose a heat resistant base for electronic equipment capable of sufficiently exhibiting performance as an optical functional material, particularly electronic equipment functional material, by having excellent transparency, heat resistance, mechanical strength and flexibility, and also by maintaining transparency without exhibiting discoloration even in a high temperature region.

Mode for Disclosure

[Heat Resistant Base for Electronic Equipment]

A “heat resistant base for electronic equipment” is a base itself that is a basic structure used in electronic equipment. Accordingly, the base itself is not a functional thin film (layer) itself exhibiting functions of a polarizing plate, an alignment film, a color filter, an optical compensation film, an anti-reflection film, an anti-glare film, a surface treatment material, an anti-static layer, a separator, a capacitor, a vibration element, an actuator or the like. The present disclosure is intended to provide a base itself supporting such an electrochemical, optically functional, electronic element-like functional thin film (layer).

(Basic Structure)

The heat resistant base for electronic equipment by the present disclosure is formed as a structure in which hollow particles are dispersed and present in a cured polyimide-based resin matrix.

(Polyimide-Based Resin)

In the present disclosure, a polyimide-based resin is used. Polyimide is a generic term for a polymer including an imide bond in a repeating unit, and generally means aromatic polyimide in which an aromatic compound is directly linked through an imide bond. Specifically, polyimide is generally represented by the following Chemical Formula (X) (in formula X, n is from 1 to 100,000).

NCOCORCOCONR' (X)

Polyimide is generally prepared by preparing polyamic acid as a precursor material from a diamine compound and a carboxylic anhydride (R—CO—O—CO—R'), heating, and imidizing the result. In the present disclosure, various polyimide-based resins may be used within the scope of purposes of the present disclosure.

In the present disclosure, modified polyimide including a terminal group represented by the following Chemical Formula 1 may be used as the polyimide-based resin.

[Chemical Formula 1]

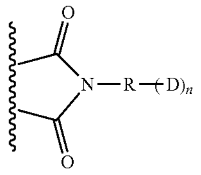

[In Chemical Formula 1,

D is a thermo-curable or photo-curable functional group,

R is a divalent or higher organic group, and n is an integer of 1 or greater.]

The functional group of Chemical Formula 1 is a thermo-curable or photo-curable functional group derived from a reaction of a terminal group of an acid dianhydride of polyimide and a compound of the following Chemical Formula 2.

[Chemical Formula 2]

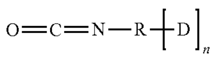

Herein, the thermo-curable or photo-curable functional group represented by D is one or more functional groups selected from the group consisting of a vinyl group, an alkane group, an acrylate group, a carboxyl group, an amide group, an amino group, an epoxy group, an isocyanate group, a cyano group, an acid anhydride group, a mercapto group, a silanol group, an alkoxysilane group, a hydroxyl group and an oxazoline group, is preferably selected from among an acrylate group, an epoxy group, an isocyanate group and a mercapto group, and is more preferably an acrylate group.

More specifically, Chemical Formula 2 is a compound selected from among the following Chemical Formulae 2a to 2c, and is preferably a compound modified by an acryloyl group of Chemical Formula 2a and isocyanate.

<Chemical Formula 2a>

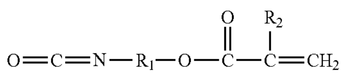

-continued

<Chemical Formula 2b>

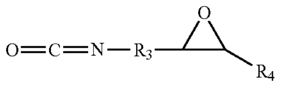

<Chemical Formula 2c>

$O{=}C{=}N{-}R_5{-}SH$

According to the present disclosure, the modified polyimide is prepared using a method of reacting a tetracarboxylic dianhydride and a diamine in a polymerization solvent to polymerize polyamic acid, imidizing the polyamic acid to prepare polyimide of Chemical Formula 3 having an acid dianhydride group at the end, and reacting the polyimide of Chemical Formula 3 and a compound of the following Chemical Formula 2 to prepare a polyimide compound of Chemical Formula 4 including a curable functional group at the end.

<Chemical Formula 2>

$O{=}C{=}N{-}R{-}[D]_n$

<Chemical Formula 3>

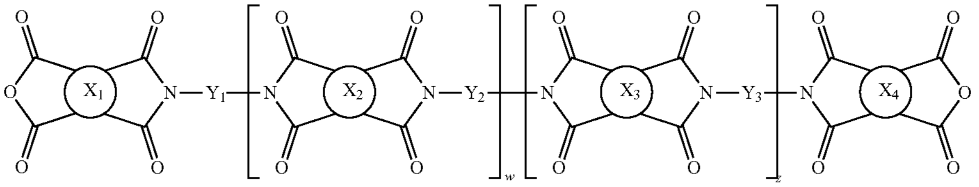

<Chemical Formula 4>

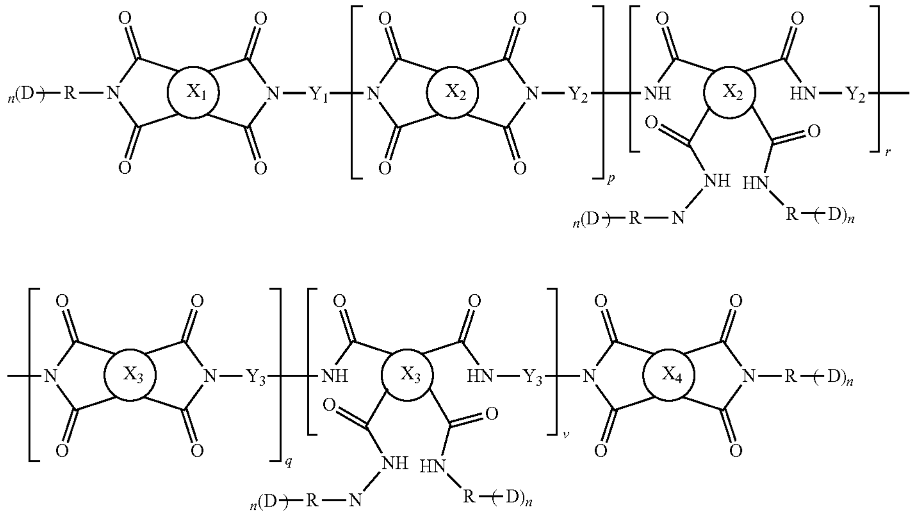

[In Chemical Formulae 2a to 2c, $R_1$, $R_3$ and $R_5$ are an alkylene group having 1 to 18 carbon atoms or an arylene group having 6 to 24 carbon atoms, or a divalent organic group linking these through an ether bond, an ester bond, an urethane bond, an amide bond, a siloxane bond or a silazane bond, and at least one hydrogen included in the divalent organic group is unsubstituted or substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic acid group, an aldehyde group, an epoxy group, a cyano group, a nitro group, an amino group, a sulfonic acid group and derivatives thereof, is preferably substituted with a halogen atom, an alkyl group having 1 to 10 carbon atoms or a halogenated alkyl group, and $R_2$ and $R_4$ are a hydrogen atom or an alkyl group having 1 to 18 carbon atoms.]

[In Chemical Formulae 2 to 4,

D is a thermo-curable or photo-curable functional group,

R is a divalent or higher organic group, n is an integer of 1 or greater, $X_1$, $X_2$, $X_3$ and $X_4$ are each independently a tetravalent organic group derived from a tetracarboxylic dianhydride, $Y_1$, $Y_2$ and $Y_3$ are each independently a divalent organic group derived from a diamine, w and z are each independently an integer of 1 or greater, p, q, r and v are each independently an integer of 0 or greater, but are not 0 at the same time, and the value of p+q+r+v is smaller than or the same as the value of w+z.

In Chemical Formula 4, p+q+r+v is an integer of 2 to 100.]

In other words, the isocyanate group of Chemical Formula 2 reacts not only with the dianhydride group at the end of the polyimide but also with the imide group included in the main chain of the polyimide, which results in opening of the imide group in the main chain, and as a result, the organic group having a curable functional group bonding at the end may bond to the side chain of the opened polyimide.

In addition, the polyimide of the present disclosure further includes a repeating structure represented by the following Chemical Formulae 5a to 5c in the main chain.

<Chemical Formula 5a>

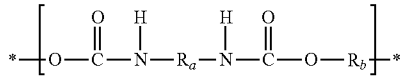

<Chemical Formula 5b>

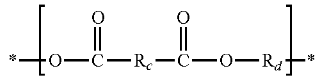

<Chemical Formula 5c>

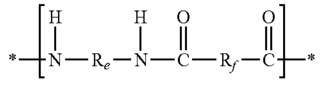

In Chemical Formulae 5a to 5c, $R_a$, $R_b$, $R_c$, $R_d$, $R_e$ and $R_f$ are each selected from the group consisting of aromatic, alicyclic and aliphatic divalent organic groups, specifically a divalent aromatic organic group selected from the group consisting of Chemical Formulae 9a to 9d to describe below, and more specifically a divalent aromatic organic group selected from the group consisting of Chemical Formulae 10a to 10p to describe below.

$X_1$, $X_2$, $X_3$ and $X_4$ are a tetravalent organic group derived from a dianhydride, and more preferably derived from a tetracarboxylic dianhydride including an aromatic tetravalent organic group.

The tetracarboxylic dianhydride that may be used in preparing the polyimide of Chemical Formula 3 is a tetracarboxylic dianhydride including functional groups $X_1$, $X_2$, $X_3$ and $X_4$ in Chemical Formula 3, and for example, a tetracarboxylic dianhydride including a tetravalent organic group in which monocyclic aromatic, polycyclic aromatic, or combined groups thereof in the molecule are linked to each other by a crosslinked structure.

Specifically, $X_1$, $X_2$, $X_3$ and $X_4$ are selected from the group consisting of aromatic tetravalent organic groups of the following Chemical Formulae 7a to 7d.

<Chemical Formula 7a>

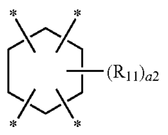

<Chemical Formula 7b>

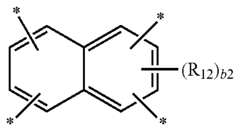

-continued

<Chemical Formula 7c>

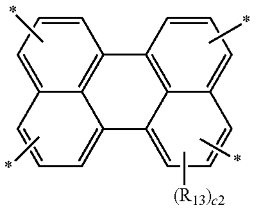

<Chemical Formula 7d>

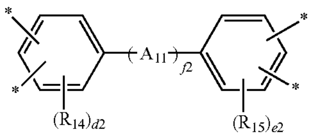

In Chemical Formulae 7a to 7d, $R_{11}$ to $R_{15}$ are each independently an alkyl group having 1 to 10 carbon atoms, or a fluoroalkyl group having 1 to 10 carbon atoms, a2 is an integer of 0 or 2, b2 is an integer of 0 to 4, c2 is an integer of 0 to 8, d2 and e2 are each independently an integer of 0 to 3 and f2 is an integer of 0 to 3, and $A_{11}$ is selected from the group consisting of a single bond, —O—, —$CR_{18}R_{19}$—, —C(═O)—, —C(═O)NH—, —S—, —$SO_2$—, a phenylene group and combinations thereof. Herein, $R_{18}$ and $R_{19}$ are each independently selected from the group consisting of a hydrogen atom, an alkyl group having 1 to 10 carbon atoms and a fluoroalkyl group having 1 to 10 carbon atoms.

More specifically, $X_1$, $X_2$, $X_3$ and $X_4$ are a tetravalent organic group selected from among the following Chemical Formulae 8a to 8l, but are not limited thereto.

<Chemical Formula 8a>

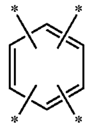

<Chemical Formula 8b>

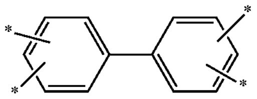

<Chemical Formula 8c>

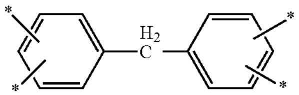

<Chemical Formula 8d>

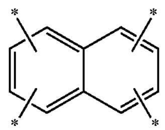

<Chemical Formula 8e>

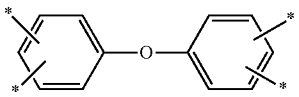

<Chemical Formula 8f>

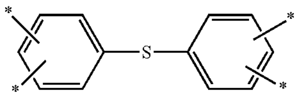

-continued

<Chemical Formula 8g>

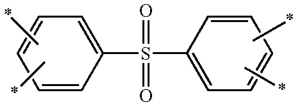

<Chemical Formula 8h>

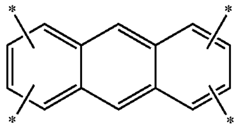

<Chemical Formula 8i>

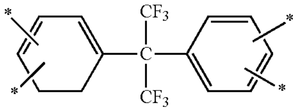

<Chemical Formula 8j>

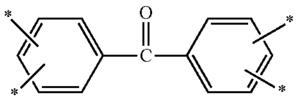

<Chemical Formula 8k>

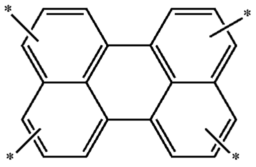

<Chemical Formula 8l>

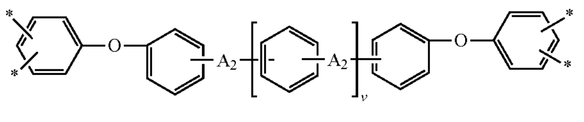

In Chemical Formula 8l, $A_2$ is selected from the group consisting of a single bond, —O—, —C(═O)—, —C(═O)NH—, —S—, —$SO_2$—, a phenylene group and combinations thereof, and v is an integer of 0 or 1.

In addition, in the aromatic tetravalent organic group of Chemical Formulae 8a to 8l, one or more hydrogen atoms present in the tetravalent organic group may be substituted with a substituent such as an alkyl group having 1 to 10 carbon atoms (for example, a methyl group, an ethyl group, a propyl group, an isopropyl group, a t-butyl group, a pentyl group, a hexyl group or the like), or a fluoroalkyl group having 1 to 10 carbon atoms (for example, a fluoromethyl group, a perfluoroethyl group, a trifluoromethyl group or the like).

Meanwhile, $Y_1$, $Y_2$ and $Y_3$ are a diamine-based compound including a divalent organic group.

Specifically, $Y_1$, $Y_2$ and $Y_3$ may be an aromatic divalent organic group derived from an aromatic diamine-based compound, or a divalent organic group that is a combined group thereof in which aliphatic, alicyclic or aromatic divalent organic groups are directly linked or linked to each other by a crosslinked structure. More specifically, $Y_1$, $Y_2$ and $Y_3$ are selected from the group consisting of functional groups of the following Chemical Formulae 9a to 9d and combinations thereof.

<Chemical Formula 9a>

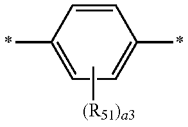

<Chemical Formula 9b>

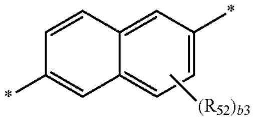

<Chemical Formula 9c>

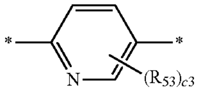

<Chemical Formula 9d>

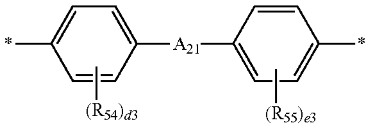

In Chemical Formulae 9a to 9d, $R_{51}$ to $R_{55}$ are each independently selected from the group consisting of an alkyl group having 1 to 10 carbon atoms (for example, a methyl group, an ethyl group, a propyl group, an isopropyl group, a t-butyl group, a pentyl group, a hexyl group or the like), a fluoroalkyl group having 1 to 10 carbon atoms (for example, a fluoromethyl group, a perfluoroethyl group, a trifluoromethyl group or the like), an aryl group having 6 to 12 carbon atoms (for example, a phenyl group, a naphthalenyl group or the like), a sulfonic acid group and a carboxylic acid group, a3, d3 and e3 are each independently an integer of 0 to 4, b3 is an integer of 0 to 6, and c3 is an integer of 0 to 3, and $A_{21}$ is selected from the group consisting of a single bond, —O—, —$CR_{56}R_{57}$—, —C(═O)—, —C(═O)NH—, —S—, —$SO_2$—, a phenylene group and combinations thereof. Herein, $R_{56}$ and $R_{57}$ are each independently selected from the group consisting of a hydrogen atom, an alkyl group having 1 to 10 carbon atoms (for example, a methyl group, an ethyl group, a propyl group, an isopropyl group, a t-butyl group, a pentyl group, a hexyl group or the like), and a fluoroalkyl group having 1 to 10 carbon atoms (for example, a fluoromethyl group, a perfluoroethyl group, a trifluoromethyl group or the like).

Herein, including an amino group at a para position is not limited to including an amino group at first and fourth positions in one benzene ring, and also means a structure in which an amino group is substituted at positions farthest from each other even when a benzene ring is fused or linked through a linking group.

More specifically, the divalent organic group including an amino group at a para position is selected from the group consisting of the following Chemical Formulae 10a to 10p:

<Chemical Formula 10a>

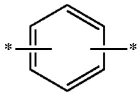

-continued

<Chemical Formula 10b>

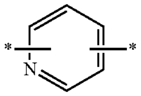

<Chemical Formula 10c>

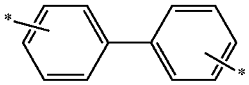

<Chemical Formula 10d>

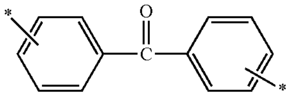

<Chemical Formula 10e>

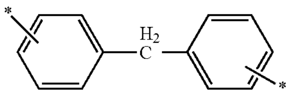

<Chemical Formula 10f>

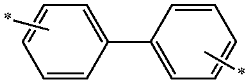

<Chemical Formula 10g>

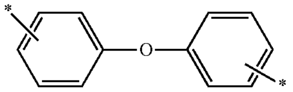

<Chemical Formula 10h>

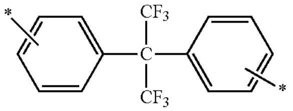

<Chemical Formula 10i>

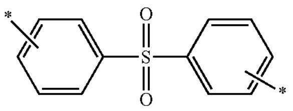

<Chemical Formula 10j>

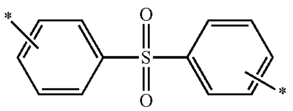

<Chemical Formula 10k>

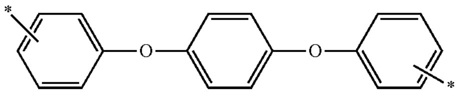

<Chemical Formula 10l>

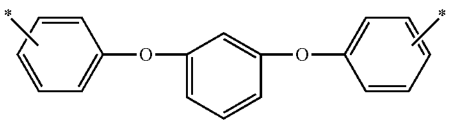

<Chemical Formula 10m>

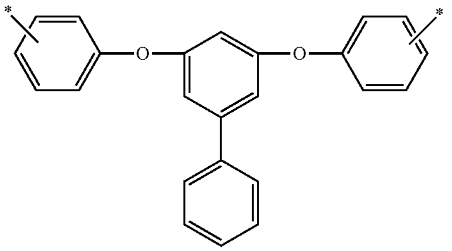

-continued

<Chemical Formula 10n>

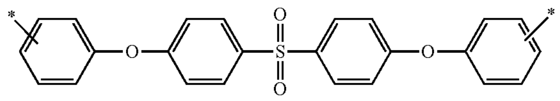

<Chemical Formula 10o>

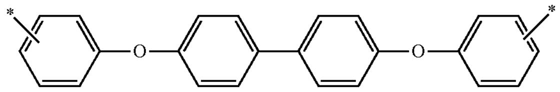

<Chemical Formula 10p>

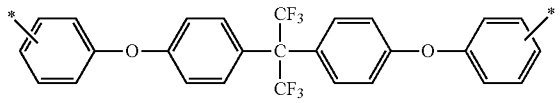

$A_{21}$ is selected from the group consisting of $CR_{56}R_{57}$—, —C(═O)—, —C(═O)NH—, —S—, —$SO_2$—, a phenylene group and combinations thereof. Herein, $R_{56}$ and $R_{57}$ are each independently selected from the group consisting of a hydrogen atom, an alkyl group having 1 to 10 carbon atoms (for example, a methyl group, an ethyl group, a propyl group, an isopropyl group, a t-butyl group, a pentyl group, a hexyl group or the like), and a fluoroalkyl group having 1 to 10 carbon atoms (for example, a fluoromethyl group, a perfluoroethyl group, a trifluoromethyl group or the like). v is an integer of 0 or 1.

In addition, one or more hydrogen atoms in the divalent functional group of Chemical Formulae 10a to 10p may be substituted with a substituent selected from the group consisting of an alkyl group having 1 to 10 carbon atoms (for example, a methyl group, an ethyl group, a propyl group, an isopropyl group, a t-butyl group, a pentyl group, a hexyl group or the like), a fluoroalkyl group having 1 to 10 carbon atoms (for example, a fluoromethyl group, a perfluoroethyl group, a trifluoromethyl group or the like), an aryl group having 6 to 12 carbon atoms (for example, a phenyl group, a naphthalenyl group or the like), a sulfonic acid group and a carboxylic acid group.

The polyimide of Chemical Formula 3 of the present disclosure is prepared using the polymerization reaction of the tetracarboxylic dianhydride and the diamine-based compound described above, and prepared using common polymerization reactions of polyimide or a precursor thereof such as solution polymerization.

Specifically, when using solution polymerization, the diamine-based compound is dissolved in the polymerization solvent described above, and then the acid dianhydride is added thereto, and the mixture is reacted.

The acid dianhydride and the diamine-based compound described above are preferably used in a proper reaction ratio considering physical properties of finally prepared polyimide. Specifically, with respect to 1 mol of the diamine-based compound, the acid dianhydride reacts in a molar ratio of 1 to 1.8, and preferably used in a molar ratio of 1:1.1 to 1:1.5, and more preferably used in a molar ratio of 1:1.1 to 1:1.3. In the present disclosure, polyimide having a dianhydride group at the end is obtained by adding and reacting the acid dianhydride in an excess molar ratio compared to the diamine.

Preferred Aspect

In the present disclosure, a polymer of 2,2'-bis(trifluoromethyl)-4,4'-diaminobiphenyl (TFMB) and 4,4'-oxydiphthalic anhydride (ODPA) is preferably used as the modified polyimide-based resin.

Another Aspect

In the present disclosure, a polyimide-based resin obtained by polyimide including a structure of the following Chemical Formula A and polyamic acid including a structure of the following Chemical Formula B is preferably used.

<Chemical Formula A>

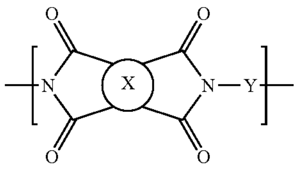

<Chemical Formula B>

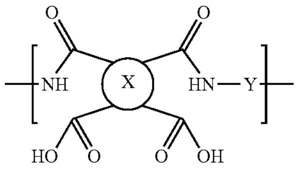

[In Chemical Formulae A and B,

X is a tetravalent organic group derived from an acid dianhydride, and

Y is a divalent organic group derived from a diamine.]

In the present disclosure, in Chemical Formulae A and B, it is preferred to use a polyimide-based resin in which, X is formed including a tetravalent organic group having a fluoro atom-containing substituent, Y is formed including a divalent organic group having a fluoro atom-containing substituent, or, both X and Y are formed including an organic group having a fluoro atom-containing substituent.

The divalent organic group having a fluoro atom-containing substituent is preferably a divalent organic group by 2,2'-bis(trifluoromethyl)benzidine or 2,2-bis[4-(-aminophenoxy)phenyl]hexafluoropropane.

In addition, in Chemical Formulae A and B in a preferred aspect of the present disclosure, X is preferably formed including a structure that is a tetravalent organic group having a fluoro atom-containing substituent, or a structure that is a tetravalent organic group not having a fluoro atom-containing substituent.

The tetravalent organic group not having a fluoro atom-containing substituent may be a compound selected from the group consisting of 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, 2,3,3',4'-oxydiphthalic anhydride and mixtures thereof.

(Content)

The polyimide-based resin is included in greater than or equal to 20% by weight and less than or equal to 90% by weight, preferably in greater than or equal to 30% by weight and less than or equal to 80% by weight, and more preferably in greater than or equal to 40% by weight and less than or equal to 70% by weight, with respect to a total mass (100% by weight) of the heat resistant base for electronic equipment. By the polyimide-based resin being included in a lower limit value of 20% by weight or greater with respect to the total weight, mechanical strength of the base such as flexibility and bending resistance may be sufficiently guaranteed, and by the upper limit value being 90% by weight or less, transparency may be sufficiently retained even at a high temperature (for example, 320° C. or higher).

(Preparation)

According to the present disclosure, target polyimide is prepared by preparing polyamic acid as a precursor material from a diamine compound and a carboxylic anhydride (R—CO—O—CO—R'), and heating and imidizing the result. During or after the polymerization, modifications may also be made by modification, substitution, addition or the like. Herein, a solvent, an additive such as a polymerization initiator may be used for adjustments.

〈Polymerization Solvent〉

As the polymerization solvent, those selected from the group consisting of ketones such as methyl ethyl ketone or cyclohexanone; aromatic hydrocarbons such as toluene, xylene or tetramethylbenzene; glycol ethers (cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether or triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N,N-dimethylacetamide (DMAc), N-methylpyrrolidone (NMP), N-ethylpyrrolidone (NEP), 1,3-dimethyl-2-imidazolidinone, N,N-dimethylmethoxyacetamide, dimethyl sulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl) ether, 1,2-bis(2-methoxyethoxy)ethane, bis[2-(2-methoxyethoxy)] ether and mixtures thereof may be specifically used as the organic solvent, and preferably N,N-diethylacetamide, N,N-diethylformamide, N-ethylpyrrolidone or mixtures thereof are included.

〈Polymerization Reaction〉

In addition, the polymerization reaction is preferably conducted for 5 hours to 50 hours, 10 hours to 40 hours, or 20 hours to 30 hours at a temperature of 30° C. to 65° C., or a temperature of 40° C. to 60° C. after stirring for 0.5 hours to 5 hours, or 1 hour to 3 hours at a temperature of 10° C. to 30° C., a temperature of 15° C. to 25° C., or room temperature.

〈Terminal Sealant〉

When synthesizing the polyamic acid or the polyimide of the present disclosure, a terminal sealant sealing the polyimide end by reacting a dicarboxylic anhydride or a monoamine at the end of the molecule may be further added in order to inactivate the excess polyamino group or acid anhydride group, and preferably, a dicarboxylic anhydride is used to seal the end.

Examples of the dicarboxylic anhydride used to seal the end of the polyimide or the polyamic acid may include phthalic anhydride, 2,3-benzophenonedicarboxylic anhydride, 3,4-benzophenonedicarboxylic anhydride, 2,3-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, 1,9-anthracenedicarboxylic anhydride and the like. These dicarboxylic anhydrides may have a group not reactive with the amine or the dicarboxylic anhydride in the molecule.

In addition, examples of the monoamine may include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-nitroaniline, o-bromoaniline, m-bromoaniline, o-nitroaniline, m-nitroaniline, p-nitroaniline, o-aminophenol, m-aminophenol, p-aminophenol, o-anilidine, m-anilidine, p-anilidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenol phenyl ether, 3-aminophenol phenyl ether, 4-aminophenol phenyl ether, 2-aminobenzophenone, 3-aminobenzophenone, 4-aminobenzophenone, 2-aminophenol phenyl sulfide, 3-aminophenol phenyl sulfide, 4-aminophenol phenyl sulfide, 2-aminophenol phenyl sulfone, 3-aminophenol phenyl sulfone, 4-aminophenol phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-2-naphthol, 1-aminoanthracene, 2-aminoanthracene, 9-aminoanthracene and the like. These monoamines may have a group not reactive with the amine or the dicarboxylic anhydride in the molecule.

The terminal sealant is included in 20 parts by weight or less, preferably in 1 parts by weight to 10 parts by weight, and more preferably in 1 parts by weight to 5 parts by weight with respect to a total 100 parts by weight of the tetracarboxylic dianhydride and the diamine.

〈Imidization〉

For the polyamic acid obtained as a result of the polymerization reaction, an imidization process is conducted. Herein, the imidization process is specifically conducted by chemical imidization or thermal imidization, and is preferably conducted by thermal imidization.

Specifically, chemical imidization is conducted while removing waver using a dehydrating agent such as an acid anhydride such as acetic anhydride, propionic anhydride or benzoic anhydride, or acid chlorides thereof; or a carbodiimide compound such as dicyclohexylcarbodiimide. Herein, the dehydrating agent is preferably used in a content of 0.1 mols to 10 mols with respect to 1 mol of the acid dianhydride described above. In addition, in the chemical imidization, a heating process at a temperature of 60° C. to 120° C. may also be conducted together.

In addition, the thermal imidization is conducted by heat treatment at a temperature of 80° C. to 400° C., and herein, a process of azeotropically removing water produced as a result of the dehydration reaction using benzene, toluene, xylene or the like is more preferably conducted together.

Meanwhile, the chemical imidization or thermal imidization process is conducted under a base catalyst such as pyridine, isoquinoline, trimethylamine, triethylamine, N,N-dimethylaminopyridine, imidazole, 1-methylpiperidine or 1-methylpiperazine. Herein, the base catalyst is used in a content of 0.1 mols to 5 mols with respect to 1 mol of the acid dianhydride described above.

Using such an imidization process, H of —CO—NH— and OH of —CO—OH in the polyamic acid molecule are dehydrated to prepare polyimide having a cyclic chemical structure (—CO—N—CO—).

〈Separation and Drying〉

The prepared polyimide is separated from the polymerization solvent and dried to be used. The separation process is conducted by adding a poor solvent for polyimide such as methanol or isopropyl ether to the resultantly obtained solution to precipitate polyimide, and then using processes such as filtration, washing and drying. After that, as the re-dissolving solvent, solvents such as the organic solvent used in the polymerization reaction may be used.

〈Molecular Weight〉

The polyimide prepared as above has a number average molecular weight of 500 g/mol to 80,000 g/mol. In addition, the functional group-modified polyimide has a number average molecular weight of 500 g/mol to 80,000 g/mol, and preferably 500 g/mol to 50,000 g/mol or 500 g/mol to 30,000 g/mol. In addition a ratio between the weight average molecular weight and the number average molecular weight (Mw/Mn) is greater than or equal to 1 and less than or equal to 3, and preferably greater than or equal to 1 and less than or equal to 2.

When the polyimide and modified polyimide has a number average molecular weight of 500 or greater, the prepared film has enhanced mechanical properties, and when the number average molecular weight is 80,000 or less, effects of favorable fluidity, and preparation process readiness of allowing uniform coating during the coating are obtained.

By the polyimide including an oligomer form with a relatively low molecular weight, many reaction points capable of reacting with a curable reacting group may be secured, and in addition thereto, an effect of reducing a yellowness index (YI) phenomenon is obtained since transmittance is enhanced by the low molecular weight.

〈Repeating Unit〉

According to one embodiment of the present disclosure, polyimide including the repeating unit of Chemical Formula 1 may be prepared by dissolving the polyimide prepared by the separation and the drying in a solvent, and then reacting the result with a compound including the curable functional group represented by Chemical Formula 2 for 5 hours to 30 hours and preferably for 10 hours to 30 hours at a temperature of room temperature to 80° C. By the reaction temperature and the reaction time being in the above-mentioned ranges, gelation of the polyimide solution is significantly suppressed, and the coating solution may be uniformly coated.

〈Solvent〉

As the solvent used in the reaction of the polyimide and the compound of Chemical Formula 2, all solvents may be used as long as they dissolve the polyimide according to one embodiment of the present disclosure. Examples of the solvent may include an aprotic solvent such as N-methylpyrrolidone (NMP), N-ethylpyrrolidone (NEP), y-butyrolactone (GBL), dimethylformamide (DMF), diethylformamide (DEF), dimethylacetamide (DMAc), diethylacetamide (DEAc), tetrahydrofuran (THF) or 2-butylcellosolve, or metacresol, phenol, halogenated phenol, and the like.

In addition, the polyimide and the compound of Chemical Formula 2 react in a ratio of 1:2 to 1:8, and preferably 1:2 to 1:6.

〈Curing〉

The prepared modified polyimide is mixed with a photopolymerization initiator or a thermal polymerization initiator and a solvent to prepare a curable resin composition of the present disclosure.

《Solvent》

The solvent is not particularly limited as long as it uniformly dissolves the constituents, and is chemically stable and thereby has no reactivity with the components of the composition. Examples of the solvent may include an aprotic solvent such as N-methylpyrrolidone (NMP), N-ethylpyrrolidone (NEP), γ-butyrolactone (GBL), dimethylformamide (DMF), diethylformamide (DEF), dimethylacetamide (DMAc), diethylacetamide (DEAc), tetrahydrofuran (THF) or 2-butylcellosolve, or metacresol, phenol, halogenated phenol, and the like.

《Photopolymerization Initiator》

The photopolymerization initiator performs a role of, for example, initiating radical photocuring in an exposed portion of the resin composition. As the photopolymerization initiator, those known in the art may all be used, and materials such as a benzoin-based compound formed with benzoin, and alkyl ethers thereof such as benzoin methyl ether or benzoin ethyl ether; an acetophenone-based compound such as acetophenone, 2,2-dimethoxy-2-phenylacetophenone, 1,1-dichloroacetophenone or 4-(1-t-butyldioxy-1-methylethyl)acetophenone; an anthraquinone-based compound such as 2-methylanthraquinone, 2-amylanthraquinone, 2-t-butylanthraquinone or 1-chloroanthraquinone; a thioxanthone compound such as 2,4-dimethylthioxanthone, 2,4-diisopropylthioxanthone or 2-chlorothioxanthone; a ketal compound such as acetophenone dimethyl ketal or benzyl dimethyl ketal; and a benzophenone-based compound such as benzophenone, 4-(1-t-butyldioxy-1-methylethyl)benzophenone or 3,3',4,4'-tetrakis(t-butyldioxycarbonyl)benzophenone may be used.

In addition, an α-aminoacetophenone compound such as 2-methyl-1-[4-(methylthio)phenyl]-2-morpholinopropanone-1,2-benzyl-2-dimethylamino-1-(4-morpholinophenyl)-butan-1-one, 2-(dimethylamino)-2-[(4-methylphenyl) methyl]-1-[4-(4-morpholinyl)phenyl]-1-butanone, N,N-dimethylaminoacetophenone (as commercial products, Irgacure (registered trademark) 907, Irgacure 369, Irgacure 379 and the like manufactured by Ciba Specialty Chemicals Inc. (currently, Ciba Japan)); and an acylphosphine oxide compound such as 2,4,6-trimethylbenzoyldiphenylphosphine oxide, bis(2,4,6-trimethylbenzoyl)-phenylphosphine oxide, bis(2,6-dimethoxybenzoyl)-2,4,4-trimethyl-pentylphosphine oxide (as commercial products, Lucirin (registered trademark) TPO manufactured by BASF Corporation, Irgacure 819 manufactured by Ciba Specialty Chemicals Inc. and the like) may also be used as a suitable photoinitiator. Examples of another suitable photoinitiator may include an oxime ester compound. Specific examples of the oxime ester compound may include 2-(acetyloxyiminimethyl)thioxanthen-9-one, (1,2-octanedione, 1-[4-(phenylthio)phenyl]-, 2-(O-benzoyloxime)), (ethanone, 1-[9-ethyl-6-(2-methylbenzoyl)-9H-carbozol-3-yl]-, 1-(O-acetyloxime)) and the like. As commercial products, GGI-325, Irgacure OXE01, Irgacure OXE02 manufactured by Ciba Specialty Chemicals Inc., N-1919 manufactured by ADEKA Corporation, Darocur TPO manufactured by Ciba Specialty Chemicals Inc. and the like may be included. In addition, a biimidazole-based compound, a triazine-based compound and the like may also be used as a suitable photoinitiator.

The content of the photopolymerization initiator may be from 0.5% by weight to 20% by weight, from 1% by weight to 10% by weight, or from 1% by weight to 5% by weight with respect to the total weight of the resin composition. By the photoinitiator content being in the above-mentioned range, photocuring may be favorably conducted.

《Thermal Polymerization Initiator》

As the thermal polymerization initiator, those generally known as a radial polymerization initiator may be used. For example, an azo compound such as 2,2'-azobisisobutyronitrile, 2,2'-azobis-(2,4-dimethylvaleronitrile) or 2,2'-azobis-(4-methoxy-2,4-dimethylvaleronitrile); an organic peroxide such as benzoyl peroxide, t-butyl peroxypivalate or 1,1'-bis-(t-butylperoxy)cyclohexane; and hydrogen peroxide may be included. When using a peroxide as the radical polymerization initiator, the peroxide may be used together with a reducing agent to be used as a redox initiator. Preferably, an azo compound may be used.

The content of the thermal polymerization initiator is from 0.5% by weight to 20% by weight, from 1% by weight to 15% by weight, or from 5% by weight to 10% by weight with respect to the total weight of the resin composition. By the thermal polymerization initiator content being in the above-mentioned range, curing may be sufficiently conducted.

《Polymerizable Compound》

According to one embodiment, the curable resin composition further includes a polymerizable compound having an ethylenically unsaturated bond and/or a urethane (meth) acrylate-based compound.

The polymerizable compound having an ethylenically unsaturated bond may enhance heat resistance and surface hardness of a polyimide protective film obtained later.

The polymerizable compound having an ethylenically unsaturated bond is selected from among monofunctional, difunctional, or trifunctional or higher (meth)acrylates, and the monofunctional (meth)acrylate may be selected from among, for example, 2-hydroxyethyl (meth)acrylate, carbitol (meth)acrylate, isobornyl (meth)acrylate, 3-methoxybutyl (meth)acrylate, 2-(meth)acryloyloxyethyl-2-hydroxypropyl phthalate and the like.

The difunctional (meth)acrylate may be selected from among, for example, ethylene glycol (meth)acrylate, 1,6-hexanediol (meth)acrylate, 1,9-nonanediol (meth)acrylate, propylene glycol (meth)acrylate, tetraethylene glycol (meth) acrylate, bisphenoxyethyl alcohol fluorene diacrylate and the like.

The trifunctional or higher (meth)acrylate may be selected from among, for example, trishydroxyethyl isocyanurate tri(meth)acrylate, trimethylpropane tri(meth)acrylate, pentaerythritol tri(meth)acrylate, pentaerythritol tetra(meth) acrylate, dipentaerythritol hexa(meth)acrylate and the like.

Alternatively, one type selected from among the monofunctional, difunctional, or trifunctional or higher (meth) acrylates may be used either alone, or as a combination of two or more types.

The polymerizable compound is included in 20 parts by weight to 100 parts by weight or in 20 parts by weight to 70 parts by weight, and preferably in 20 parts by weight to 50 parts by weight with respect to 100 parts by weight of the modified polyimide of Chemical Formula 4. When the polymerizable compound content is 20 parts by weight or greater with respect to 100 parts by weight of the modified polyimide, the degree of curing may be enhanced, and when the content is 100 parts by weight or less, adhesion of the obtained coating film may be enhanced.

The urethane (meth)acrylate-based compound is selected from among, for example, a hydroxy (meth)acrylate compound such as hydroxymethyl (meth)acrylate, hydroxyethyl (meth)acrylate or tetramethylolethane tri(meth)acrylate; and urethane (meth)acrylates containing allophanate-modified polyisocyanurate.

The urethane (meth)acrylate-based compound is included in 20 parts by weight to 100 parts by weight or in 30 parts by weight to 80 parts by weight, and preferably in 40 parts by weight to 60 parts by weight with respect to 100 parts by weight of the modified polyimide of Chemical Formula 4. When the urethane (meth)acrylate-based compound content is 20 parts by weight or greater with respect to 100 parts by weight of the modified polyimide, the degree of curing may be enhanced, and when the content is 100 parts by weight or less, adhesion of the obtained coating film may be enhanced.

According to one embodiment, the urethane resin has a weight average molecular weight of 1,000 to 20,000, and when the urethane resin has a weight average molecular weight in the above-mentioned range, efficiency of processability may be enhanced by adjusting viscosity.

In addition, as other additives, the present disclosure may further include one or more types selected from the group consisting of a surfactant, an adhesion aid, a thermal radical polymerization initiator and an antioxidant.

[Hollow Particle]

The present disclosure uses a hollow particle. An outer layer of the hollow particle may be an inorganic material or an organic material. For example, an inorganic material formed with a metal, a metal oxide, a resin, silica, aluminum oxide, titanium oxide or zinc oxide particles, or the like may be preferably included, and particularly, a hollow silica particle having a silica outer layer is preferred.

When the outer layer is silica, the corresponding silica may be in any state of crystalline, sol phase and gel phase. The shape of the hollow particle may be any one of a real sphere shape, an approximate sphere shape such as a spheroid shape and a polyhedral shape that may be closer to a sphere, a polyhedral shape, a chain shape, a needle shape, a plate shape, a fragment shape, a rod shape, a fiber shape and the like. Among these, a real spherical shape, an approximate sphere shape and a polyhedral shape are preferred, and a spheroid shape, a real sphere shape or a cubic shape is particularly preferred.

As for a particle size of the hollow particle, the average particle diameter defined as a 50% particle size (d50 median diameter) when expressing particle size distribution measured using a dynamic light scattering method as volume cumulative distribution (hereinafter, sometimes simply referred to as "average particle diameter (d50)") is greater than or equal to 10 nm and less than or equal to 300 nm, preferably greater than or equal to 30 nm and less than or equal to 200 nm, and particularly preferably greater than or equal to 40 nm and less than or equal to 150 nm.

By the hollow particle having an average particle diameter (d50) in the corresponding range, excellent transparency may be secured. In other words, by the average particle diameter (d50) of the hollow particle having a lower limit value of 10 nm or greater, porosity increases since the volume of the hollow portion increases with respect to the outer layer thickness, and by having an upper limit value of 300 nm or less, visibility of the particle may be reduced (enhance transparency), which may increase transmittance of the base.

The average particle diameter (d50) may be measured using, for example, a Microtrac particle size analyzer or a Nanotrac particle size analyzer manufactured by Nikkiso Co., Ltd. in accordance with a dynamic light scattering (DLS) method.

As such a hollow silica particle, proper materials may be selected from among commercially available products. Examples of specific products may include SiliNax (cubic shape, average particle diameter 80 nm to 130 nm) manufactured by Nittetsu Mining Co., Ltd., and, as products dispersing a hollow silica particle into a solvent, Thrulya 1110 (spherical shape, average particle diameter 50 nm), Thrulya 2320 (spherical shape, average particle diameter 50 nm), Thrulya 4110 (spherical shape, average particle diameter 60 nm), Thrulya 4320 (spherical shape, average particle diameter 60 nm) manufactured by Nikki Chemical Co., Ltd. (JGC C&C), and hollow silica (spherical shape, average particle diameter 80 nm to 150 nm) manufactured by Fuso Chemical Co., Ltd. and the like.

In addition, as the hollow particle (particularly, silica), a particle of which surface is treated with a fluorine-based compound may be mixed thereto and used. In other words, when surface treating the hollow particle with a fluorine-based compound, particle surface energy may be further reduced, which leads to more uniform distribution in the composition, and as a result, a more uniform scratch-resistance enhancing effect may be induced. As the method of introducing a fluorine-based compound to the hollow silica particle surface, a method of hydrolyzing and condensing the hollow particle and the fluorine-based compound using a sol-gel reaction under the presence of water and a catalyst may be conducted. In addition, as the hollow particle, those dispersed into an organic solvent may be used, and the solid (hollow particle) content in the dispersion liquid may be determined considering the above-described hollow particle content range and the viscosity range suitable for composition coating.

In the present disclosure, when using a hollow silica particle as the hollow particle, the polyimide-based resin preferably has a refractive index of greater than or equal to 1.40 and less than or equal to 1.55 at a wavelength of 632.8 nm after curing. When the refractive index of the polyimide-based resin after curing is in the above-mentioned range, a difference in the refractive index with the hollow silica particle decreases suppressing the occurrence of haze when dispersing the hollow silica particle, and as a result, transmittance of the base may increase.

〈Dispersant〉

According to an aspect of the present disclosure, polyether-modified silicone oil may be further included as a dispersant. By further including polyether-modified silicone oil, dispersity of the hollow particle may be enhanced.

The polyether-modified silicone oil is a silicone-based polymer surfactant introducing hydrophilic polyoxyalkylene to hydrophobic dimethyl silicone, and has a number average molecular weight of, for example, 1,000 to 100,000, and preferably 2,000 to 50,000. The polyether-modified silicone oil may be included in approximately 0.001% by weight to 1% by weight with respect to the total weight (100% by weight) of the heat resistant base for electronic equipment.

Examples of the specific product may include L-45, L-9300, FZ-3704, FZ-3703, FZ-3720, FZ-3786, FZ-3501, FZ-3504, FZ-3508, FZ-3705, FZ-3707, FZ-3710, FZ-3750, FZ-3760, FZ-3785 and Y-7499 manufactured by Nippon Unicar Co., Ltd, and KF96L, KF96, KF96H, KF99, KF54, KF965, KF968, KF56, KF995, KF351, KF352, KF353, KF354, KF355, KF615, KF618, KF945, KF6004 and FL100 manufactured by Shin-Etsu Chemical Co., Ltd., and the like.

〈Surfactant〉

According to an aspect of the present disclosure, as a surfactant, the surfactant may further include a mono to difunctional fluorine-based acrylate or a fluorine-based surfactant. By using the fluorine-based surfactant, uniform dispersibility of the hollow particle may be achieved.

As such a fluorine-based surfactant, those common in the art may be used, and constitutions thereof are not particularly limited. However, according to one embodiment of the present disclosure, commercially available products of the fluorine-based surfactant include magaface F-444, magaface F-445, magaface F-470, magaface F-477, magaface MCF-350SF of DIC Corporation, and the like.

The fluorine-based surfactant may be included in approximately 0.001% by weight to 1% by weight with respect to the total weight (100% by weight) of the heat resistant base for electronic equipment.

〈Content〉

The hollow particle is included in greater than 10% by weight and less than 80% by weight, preferably in greater than 20% by weight and less than 70% by weight, and more preferably in greater than 30% by weight and less than 60% by weight with respect to the total weight (100% by weight) of the heat resistant base for electronic equipment. By the hollow particle amount being greater than 10% by weight with respect to the total weight, transparency at a high temperature of 320° C. or higher may be enhanced, and by the amount being less than 80% by weight, mechanical strength of the base such as flexibility or bending resistance may be enhanced.

[Method for Preparing Heat Resistant Base for Electronic Equipment]

(Adjustment of Liquid Composition)

In the heat resistant base for electronic equipment, the polyimide-based resin, the hollow particle, and, as necessary, a dispersant, a surfactant, a photoinitiator, a polymerization initiator, a solvent and the like are mixed and stirred to adjust the liquid composition. The mixing and stirring may be conducted using a common stirrer and a mixer.

As the solvent, those common in the art may be used in a range that does not affect properties of the composition. The solvent may be one or more types selected from the group consisting of ketones, alcohols, acetates and ethers, and more specifically, ketones including methyl ethyl ketone, methyl isobutyl ketone, acetyl acetone and isobutyl ketone; alcohols including methanol, ethanol, n-propanol, i-propanol, n-butanol, i-butanol and t-butanol; acetates including ethyl acetate, i-propyl acetate and polyethylene glycol monomethyl ether acetate; ethers including tetrahydrofuran and propylene glycol monomethyl ether, aprotic solvents such as N-methylpyrrolidone (NMP), N-ethylpyrrolidone (NEP), γ-butyrolactone (GBL), dimethylformamide (DMF), diethylformamide (DEF), dimethylacetamide (DMAc), diethylacetamide (DEAc), tetrahydrofuran (THF) or 2-butylcellosolve, or metacresol, phenol, halogenated phenol, or mixtures thereof may be used.

The solvent may be added in a dispersion liquid form in which the hollow particles are dispersed. The solvent content may be properly determined, but may be included such that the solid concentration included in the heat resistant base for electronic equipment becomes 1% by weight to 60% by weight, and more preferably 3% by weight to 50% by weight.

(Preparation of Base)

The liquid composition adjusted above is coated on a substrate (readily peelable) and cured.

As the coating method, a bar coating method, a knife coating method, a roll coating method, a blade coating method, a die coating method, a micro gravure coating method, a comma coating method, a slot die coating method, a lip coating method, a solution casting method, or the like may be used.

As for the polymerization method, various methods such as ultraviolet irradiation, radical polymerization and polymerization by heating may be used for target curing.

(Peeling)

The cured polymer structure (film or the like) is peeled from the substrate (readily peelable), and molded to obtain the heat resistant base for electronic equipment.

[Properties]

The heat resistant base for electronic equipment preferably has light transmittance measured using a spectrophotometer of 85% or greater, and may have haze of 1.0% or less, 0.5% or less, or 0.4% or less. The measurement may be made in accordance with, for example, JIS Z8722, JIS K7361-1, JIS K7136 and JIS-K7105 using a transmission meter, a haze meter and the like.

In addition, the yellowness index (YI) value of the heat resistant base for electronic equipment may be measured in accordance with JIS K 7373 and JIS-Z8729 using the spectrophotometer. The determination criteria of the YI depend on the use or the thickness of the base as well, however, as a numerical value that yellow feel by visual appearance is not bothered when used as the heat resistant base for electronic equipment (for example, thickness 20 μm), the YI value is preferably 5.0 or less, and particularly preferably 3.0 or less. By the upper limit value of the YI being 5.0 or less, the base may be suitably used as an optical film for a display requiring high visibility.

The heat resistant base for electronic equipment may have initial color b* (b* by CIE 1976 L*a*b* color space) of 1.0 or less. In addition, a difference between the initial color b*, and color b* after being exposed to an ultraviolet lamp in a UVB wavelength region for 72 hours or longer may be 0.5 or less, or 0.4 or less.

The heat resistant base for electronic equipment has a thickness of greater than or equal to 5 μm and less than or equal to 400 μm, and preferably greater than or equal to 10 μm and less than or equal to 150 μm. Hardness of the heat resistant base for an electrochemical device may be, for example, pencil hardness (JIS K5600) of 6H or greater, 7H or greater, or 8H or greater under a load of 1 kg.

[Application]

The heat resistant base for electronic equipment may replace a glass base in terms that it has transparency, heat resistance and mechanical strength, and is also improved in terms of superior optical properties and quality. Specifically, the heat resistant base for electronic equipment may be used as a base itself that is a basic structure used in electronic equipment (optical base, electronic element, device). Accordingly, the heat resistant base for electronic equipment is used as a base supporting a basic structure in electronic equipment such as a display, a lens, a thin film transistor (TFT), a polarizing plate, an alignment film, a color filter, an optical compensation film, an anti-reflection film, an anti-glare film, a surface treatment film, an anti-static film, a separator, a capacitor, a vibration element or an actuator.

EXAMPLE

Hereinafter, the present disclosure will be described in detail by describing operations and effects of the disclosure through the following specific examples. The corresponding examples form one example of the present disclosure, and technological ideas covered by the scope of the present disclosure may all be readily implemented from the corresponding examples. Meanwhile, the examples present just one aspect of the present disclosure, and the scope of a right of the present disclosure is not limited and specified by the presence of the corresponding examples.

Example 1

〈Preparation of Modified Polyimide Resin A1〉

After dissolving 2,2'-bis(trifluoromethyl)-4,4'-diaminobiphenyl (TFMB) (1 mol) in DEF (80 g), 4,4'-oxydiphthalic anhydride (ODPA) (1.1 mol) was added thereto, and the mixture was introduced to N,N-diethylformamide (DEF) (50 g). The result was polymerized for 24 hours at 50° C. to obtain a solution including polyamic acid.

To the solution, toluene (40 g) was introduced, and, after installing a Dean-Stark distillation apparatus to remove water, the result was refluxed for 12 hours at 180° C. to obtain a polyimide solution. In the polyimide solution, precipitates were produced using a methanol solvent and then dried, and after dissolving the dried polyimide in DEF (50 g), 2-methacryloyloxyethyl isocyanate (MOI) (3 moles) was added thereto, then DEF (30 g) was introduced thereto, and the result was reacted for 24 hours at room temperature. Precipitates were produced using methanol, and then dried to obtain a modified polyimide resin A1.

〈Preparation of Thermo-curable Coating Composition a1〉

To the modified polyimide resin A1 (10 g), an urethane acryl oligomer SP260 (manufactured by Soltech Ltd.) (5 g) was introduced, and after introducing dipentaerythritol hexaacrylate (DPHA) (4 g) thereto, DEF was introduced to a thermal initiator (2,2'-azobis(2,4-dimethylvaleronitrile), V65 (manufactured by Wako Pure Chemical Industries Ltd.), 10 hours, half-life temperature 50° C.) (1 g) so that the solid content becomes 30% by weight, and the result was mixed to obtain a thermo-curable coating composition a1.

〈Preparation of Hollow Particle Silica Particle Dispersion Liquid b1〉

The surface of a hollow silica particle B1 having an average particle diameter of 80 nm was treated with a fluorine-based compound using a sol-gel reaction to obtain 20% by weight of a hollow silica particle dispersion liquid b1 in methyl isobutyl ketone (MIBK).

〈Preparation of Base〉

The thermo-curable coating composition a1 and the hollow silica particle dispersion liquid 131 were mixed such that the solid of the thermo-curable coating composition a1 and the hollow silica particle dispersion liquid 131 have a weight ratio of 70:30, and stirred to obtain a composition. The composition was coated on a peeling agent-coated glass substrate using spin coating. After that, the result was dried for 10 minutes at 100° C. in an oven under the nitrogen atmosphere, and, after raising the temperature to 350° C. at a temperature raising rate of 5° C./minute, heat treated for 30 minutes. After taking out from the oven, the result was peeled from the glass substrate to obtain a single layered polymer film base having a thickness of 20 μm.

Example 2

〈Preparation of Thermo-curable Coating Composition a2〉

To the modified polyimide resin A1 (10 g), an urethane acryl oligomer SU5260 (manufactured by Soltech Ltd.) (5 g) was introduced, and after introducing dipentaerythritol hexaacrylate (DPHA) (4 g) thereto, DEF was introduced to a thermal initiator (2,2'-azobis(2,4-dimethylvaleronitrile), V65 (manufactured by Wako Pure Chemical Industries Ltd.), 10 hours, half-life temperature 50° C.) (1 g) so that the solid content becomes 30% by weight, and the result was mixed to obtain a thermo-curable coating composition a2.

〈Preparation of Base〉

The thermo-curable coating composition a2 and the hollow silica particle dispersion liquid 131 were mixed such that the solid of the thermo-curable coating composition a2 and the hollow silica particle dispersion liquid 131 have a weight ratio of 60:40, and stirred to obtain a composition. Using the composition, a single layered polymer film base having a thickness of 20 μm was prepared in the same manner as in Example 1.

Comparative Example 1

A single layered polymer film base having a thickness of 20 μm was prepared in the same manner as in Example 1 except that only the curable coating composition was coated on a glass substrate without mixing the hollow silica particles.

Comparative Example 2

A single layered polymer film base having a thickness of 20 μm was prepared in the same manner as in Example 2 except that only the curable coating composition was coated on a glass substrate without mixing the hollow silica particles.

[Evaluation Test: Evaluation Test of Optical Properties]

For each of the polymer film bases obtained in Examples 1 and 2 and Comparative Examples 1 and 2, optical properties of the film such as transmittance and yellowness index were measured using the following method.

The transmittance was measured using a spectrophotometer (manufactured by JASCO, model V-770). In addition, the yellowness index ("YI") was measured by installing an integration sphere unit in the spectrophotometer and using a color evaluation (color diagnosis) program VWCD-960. These results are as shown in Table 1.

[Result]

As described in the following [Table 1], in Example 1 and Comparative Example 1, and in Example 2 and Comparative Example 2 having the same base thickness, transmittance (at 550 nm) (%) and transmittance (at 460 nm) (%) were far superior in Example 1 in terms of transparency, and as for "YI", it was understood that Examples 1 and 2 clearly had a lower degree of coloration compared to Comparative Examples 1 and 2.

TABLE 1

| | Example 1 | Example 2 | Comparative Example 1 | Comparative Example 2 |
|---|---|---|---|---|
| Polyimide Resin | A1 | A1 | A1 | A1 |
| Thermo-curable Coating Composition | a1 | a2 | a1 | a2 |
| Hollow Silica Particle | B1 | B1 | None | None |
| Hollow Silica Particle Dispersion Liquid | b1 | b1 | None | None |

TABLE 1-continued

| | Example 1 | Example 2 | Comparative Example 1 | Comparative Example 2 |
|---|---|---|---|---|
| Weight Ratio of Solid of Thermo-curable Coating Composition and Hollow Silica Particle Dispersion Liquid | 70:30 | 60:40 | 100:0 | 100:0 |
| Base Thickness (um) | 20 | 20 | 20 | 20 |
| Transmittance (at 550 nm) (%) | 90 | 89 | 86 | 85 |
| Transmittance (at 460 nm) (%) | 88 | 88 | 82 | 80 |
| YI | 2.5 | 2.6 | 6.0 | 6.3 |

The invention claimed is:

1. A heat resistant base for electronic equipment, the base comprising:

a polyimide-based resin; and hollow particles, wherein the hollow particles are dispersed in the polyimide-based resin; and the hollow particles have an average particle diameter of greater than or equal to 10 nm and less than or equal to 300 nm, wherein the hollow particles are hollow silica particles, and the hollow silica particles are surface treated with a fluorine-based compound, and wherein the hollow silica particles are included in an amount of greater than 30% by weight and less than 60% by weight with respect to the total weight of the heat resistant base, and the polyimide-based resin has a refractive index of greater than or equal to 1.40 and less than or equal to 1.55 at a wavelength of 632.8 nm after curing.

2. The heat resistant base for electronic equipment of claim 1, wherein the polyimide-based resin is a modified polyimide with a structure represented by the following Chemical Formula 4:

[Chemical Formula 4]

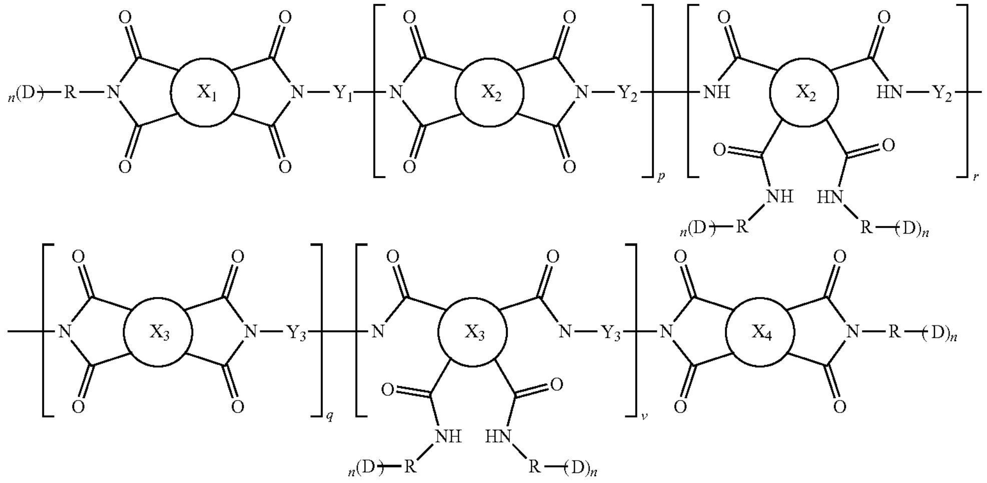

in the Chemical Formula 4,

D is a thermo-curable or photo-curable functional group,

R is a divalent or higher organic group, n is an integer of 1 or greater,

X1, X2, X3 and X4 are each independently a tetravalent organic group derived from a tetracarboxylic dianhydride, Y1, Y2 and Y3 are each independently a divalent organic group derived from a diamine, p, q, r and v are each independently an integer of 0 or greater, but are not 0 at the same time, and the value of p+q+r+v is an integer of 2 to 100.

3. The heat resistant base for electronic equipment of claim 1, wherein the polyimide-based resin is a modified polyimide that is from a reaction of 2,2'-bis(trifluoromethyl)-4,4'-diaminobiphenyl (TFMB) and 4,4'-oxydiphthalic anhydride (ODPA).

4. The heat resistant base for electronic equipment of claim 1, wherein the polyimide-based resin comprises a polyimide including a structure of the following Chemical Formula A and a polyamic acid including a structure of the following Chemical Formula B:

[Chemical Formula A]

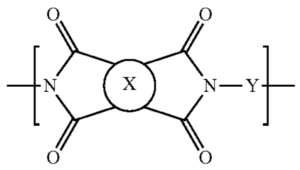

-continued

[Chemical Formula B]

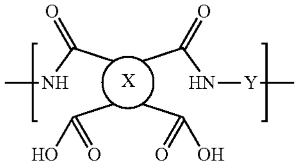

in the Chemical Formulae A and B,

X is a tetravalent organic group derived from an acid dianhydride; and

Y is a divalent organic group derived from a diamine.

5. The heat resistant base for electronic equipment of claim 4, wherein, in the Chemical Formula A and Chemical Formula B, X is a tetravalent organic group having a fluorine atom-containing substituent;

Y is a divalent organic group having a fluorine atom-containing substituent; or, both X and Y are organic groups having a fluorine atom-containing substituent.

6. The heat resistant base for electronic equipment of claim 5, wherein the divalent organic group having a fluorine atom-containing substituent is 2,2'-bis(trifluoromethyl) benzidine or 2,2-bis[4-(4-aminophenoxy)phenyl]hexafluoropropane.

7. The heat resistant base for electronic equipment of claim 4, wherein, in the Chemical Formulae A and B, X is a tetravalent organic group having a fluorine atom-containing substituent, or a tetravalent organic group not having a fluorine atom-containing substituent.

8. The heat resistant base for electronic equipment of claim 7, wherein the tetravalent organic group not having a fluorine atom-containing substituent is from a compound selected from 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, 2,3,3',4'-oxydiphthalic anhydride and mixtures thereof.

9. The heat resistant base for electronic equipment of claim 1, wherein the hollow silica particles have an average particle diameter of greater than or equal to 40 nm and less than or equal to 150 nm.

10. The heat resistant base for electronic equipment of claim 1, wherein the heat resistant base has, a light transmittance of at least 85%;

a haze of 1.0% or less;

an initial color b* of 1.0 or less, wherein b* is Blue/Yellow Value, a* is Red/Green Value and L* is Lightness according to CIE 1976 L*a*b* color space; and a difference of 0.5 or less between the initial color b*, and a color b* after being exposed to an ultraviolet lamp in a UVB wavelength region for at least 72 hours.

11. The heat resistant base for electronic equipment of claim 10, wherein the heat resistant base has a yellowness index value “YI value” of 5.0 or less.

12. The heat resistant base for electronic equipment of claim 1, wherein the heat resistant base is a basic structure of the electronic equipment.

13. The heat resistant base for electronic equipment of claim 1, wherein the heat resistant base is for supporting a basic structure in a display, a lens, a thin film transistor (TFT), a polarizing plate, an alignment film, a color filter, an optical compensation film, an anti-reflection film, an anti-glare film, a surface treatment film, an anti-static film, a separator, a capacitor, a vibration element or an actuator.

* * * * *